(12) United States Patent
Vario

(10) Patent No.: US 6,368,036 B1
(45) Date of Patent: Apr. 9, 2002

(54) DEVICE AND METHOD FOR LOADING NURSERY ITEMS ON A TRUCK

(75) Inventor: Michael E. Vario, Amity, OR (US)

(73) Assignee: Monrovia Nursery Company, Azusa, CA (US)

( * ) Notice: Subject to any disclaimer, the term of this patent is extended or adjusted under 35 U.S.C. 154(b) by 0 days.

(21) Appl. No.: 09/399,296

(22) Filed: Sep. 17, 1999

(51) Int. Cl.⁷ .......................... B61D 45/00; B65D 63/00
(52) U.S. Cl. .......................... 410/98; 410/97; 410/100; 410/121; 410/129; 410/34
(58) Field of Search ............................. 410/96, 97, 98, 410/100, 121, 129, 140, 32, 34

(56) References Cited

U.S. PATENT DOCUMENTS

| | | | | |
|---|---|---|---|---|
| 1,088,347 A | * | 2/1914 | Koehler | |
| 1,705,060 A | * | 3/1929 | Hintz | |
| 4,264,251 A | | 4/1981 | Blatt | 410/100 |
| 4,338,053 A | * | 7/1982 | Abel | |
| 6,089,802 A | * | 7/2000 | Bullock | |
| 6,099,221 A | * | 8/2000 | Takagi | |

* cited by examiner

Primary Examiner—Stephen T. Gordon
Assistant Examiner—Scott Carpenter
(74) Attorney, Agent, or Firm—Christie, Parker & Hale, LLP (57) ABSTRACT

A device and method of loading nursery items on a truck is disclosed wherein a portion of a first panel of high tensile strength sheet material is adhered to a first wall of a truck's storage compartment and a portion of a second panel of high tensile strength sheet material is adhered to a second wall of the truck in mirror relationship to the first panel. Various nursery items are packed in the storage compartment between the first panel and the second panel. A gate is positioned in front of the packed nursery items between the first and second panels. The second ends of the first and second panels are secured together in a tensile state such that the gate and the nursery items are securely held in place.

21 Claims, 12 Drawing Sheets

DEVICE AND METHOD FOR LOADING NURSERY ITEMS ON A TRUCK

BACKGROUND OF THE INVENTION

The present invention relates to a device and method for securing and transporting a shipment of goods and more particularly to a device and method for securing and transporting nursery items, such as plants, flowers, trees, bushes, perennials and other similar items.

Historically, growers maintain centralized farms where the nursery goods are cultivated and grown. When an order is placed by a customer for the purchase of nursery items, the grower must ship products to the customer. Traditionally, large trucks are used to transport these nursery items. To minimize the cost and the time associated with delivery, each truck is loaded with goods for several customers. The trucks travel nationwide, making numerous stops along the way. It is not uncommon for the nursery items to remain on the truck for several days or weeks. Accordingly, the nursery items must be secured to ensure that the items remain intact during shipping.

Figure 1:
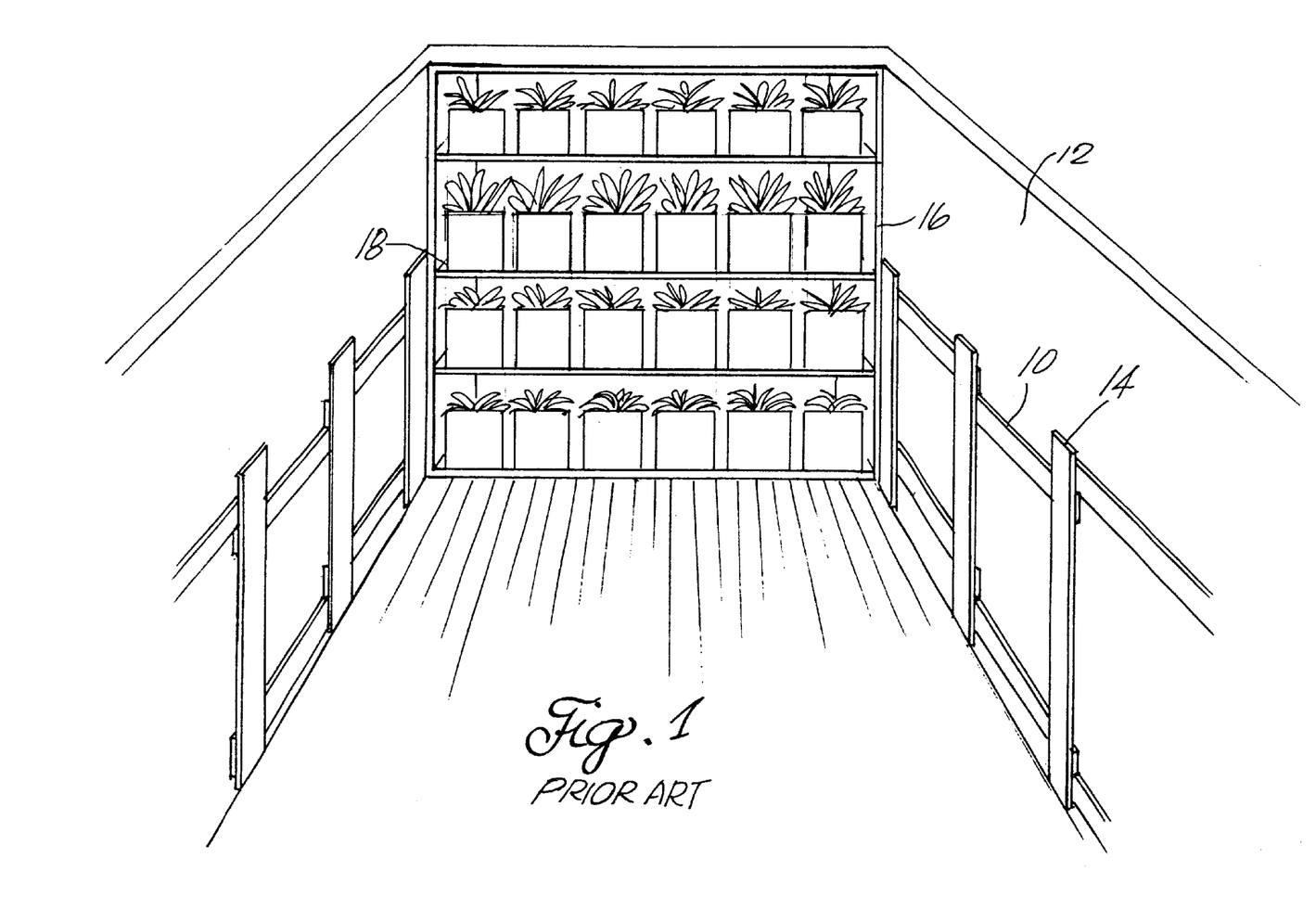
FIG. 1 shows a known loading technique having a wood lining along the body of the truck and wood shelves for holding the nursery items.
Figure 2:
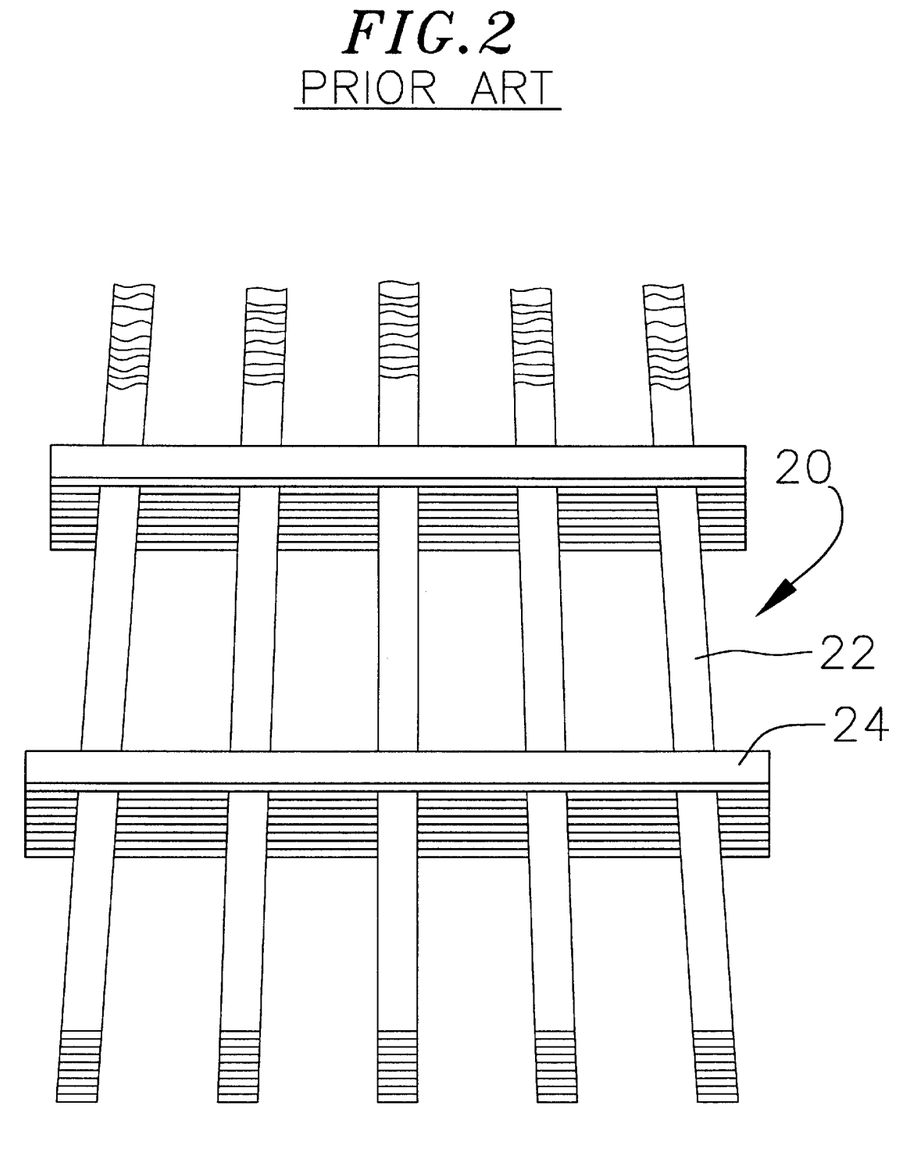
FIG. 2 shows a wooden gate used in known loading techniques.

The conventional method of shipping nursery items has been to use lumber to secure the goods in the truck. A known nursery loading device is shown in FIG. 1. According to known loading techniques, wooden boards 10 are attached horizontally along the length of the truck body 12 to provide a wood lining for the truck. Additional wooden boards 14 are attached vertically at intermittent intervals along the length of the truck body 12. To stack nursery items 16, wooden shelves 18 are built that can withstand the weight and the water drainage from the plants. To prevent the nursery items from shifting, a wooden gate 20, shown in FIG. 2, is built and used as a barrier to restrain the items. Wooden gate 20 is positioned in front of the loaded nursery items in a perpendicular relationship to the wood lining 10, 14 attached to the side walls of the truck. The attachment of the gate 20 to the wood lining creates a barrier that prevents the nursery items from shifting in the truck.

The wooden gate is usually built by aligning five to ten 4" by 1" wooden boards 22 parallel to each other and connecting the parallel boards 22 together using additional 4" by 1" wooden boards 24 which are attached perpendicularly to the parallel boards. The gate 20 is then attached to wood lining 10, 14 on the truck walls 12 using known fasteners.

The cost of the traditional methods of shipping nursery items is high. The grower bears the cost of purchasing the lumber with which the wooden lining, wooden shelves, and wooden gates are fabricated. The cost of labor increases as the laborers are required to build these wooden structures for every shipment. Additionally, the attachment of the wood to the truck body can cause permanent damage to the truck walls for which the grower is responsible. Once the items arrive at the customer's location, the customer bears the cost of the labor for deconstructing the wooden structures. This task can be a difficult one requiring the use of crowbars to detach and tear down the wooden gates, shelves and lining. The customer also bears the cost of the disposal of the dunnage.

In recent years, disposal fees have increased causing the customers to be concerned with the amount of lumber that is used in the loading method. Moreover, customers have been concerned with the wasteful use of materials that are not recyclable. These concerns have given rise to a need for an improved shipping technique that reduces the amount of required lumber in the loading method. Yet, it is still necessary to provide sufficient structural support for securing the nursery items during shipment such that the customer does not receive damaged goods. The growers have also been concerned with the rising cost of lumber, and the corresponding rise in the cost of known shipping techniques. Reducing the amount of lumber used in loading shipments will reduce the costs of shipping for both the growers and the customers and customer satisfaction will result in increased sales. Accordingly, it is desirable to provide an improved loading technique that reduces the amount of lumber used, and replaces the lumber with material that is deconstructed and disposed of easily.

SUMMARY OF THE INVENTION

It is an object of the present invention to provide a secure means of transporting nursery items while reducing the amount of lumber utilized in the shipping method.

It is another object of the present invention to simplify the unloading process such that the customer's costs associated with labor and disposal fees are minimized.

It is yet another object of the present invention to utilize material in the loading process that can be reused or recycled.

It is yet another object of the present invention to utilize a material that does not damage the truck body and does not result in additional cleaning charges from the carrier.

Accordingly, a device and method of loading nursery items on a truck is disclosed that offers greater value to customers by simplifying the transport and unloading of nursery item products, while also eliminating the nuisance and disposal cost of wood framing that has ben used to brace loads in the past.

One embodiment of the present invention is a device and method of loading nursery items on a truck wherein a portion of a first panel of high tensile strength sheet material is adhered to a first wall of a truck's storage compartment and a portion of a second panel of high tensile strength sheet material is adhered to a second wall of the truck in mirror relationship to the first panel. Various nursery items are packed in the storage compartment between the first panel and the second panel. A gate is positioned in front of the packed nursery items between the first and second panels. The second ends of the first and second panels are secured together in a tensile state such that the gate and the nursery items are securely held in place.

The loading technique of the present invention allows a reduction in the amount of lumber required by as much as 95%, reducing waste disposal and fees. Additionally, the process of unloading is simplified because the deconstruction only requires a pair of scissors, in place of the crowbar required for the prior techniques. Furthermore, the gate of the present invention can be recycled and used for other purposes.

DESCRIPTION OF THE DRAWINGS

Other objects and advantages of the invention will become apparent upon reading the following detailed description of the invention and upon reference to the drawings in which.

DETAILED DESCRIPTION OF THE INVENTION

Figure 3:
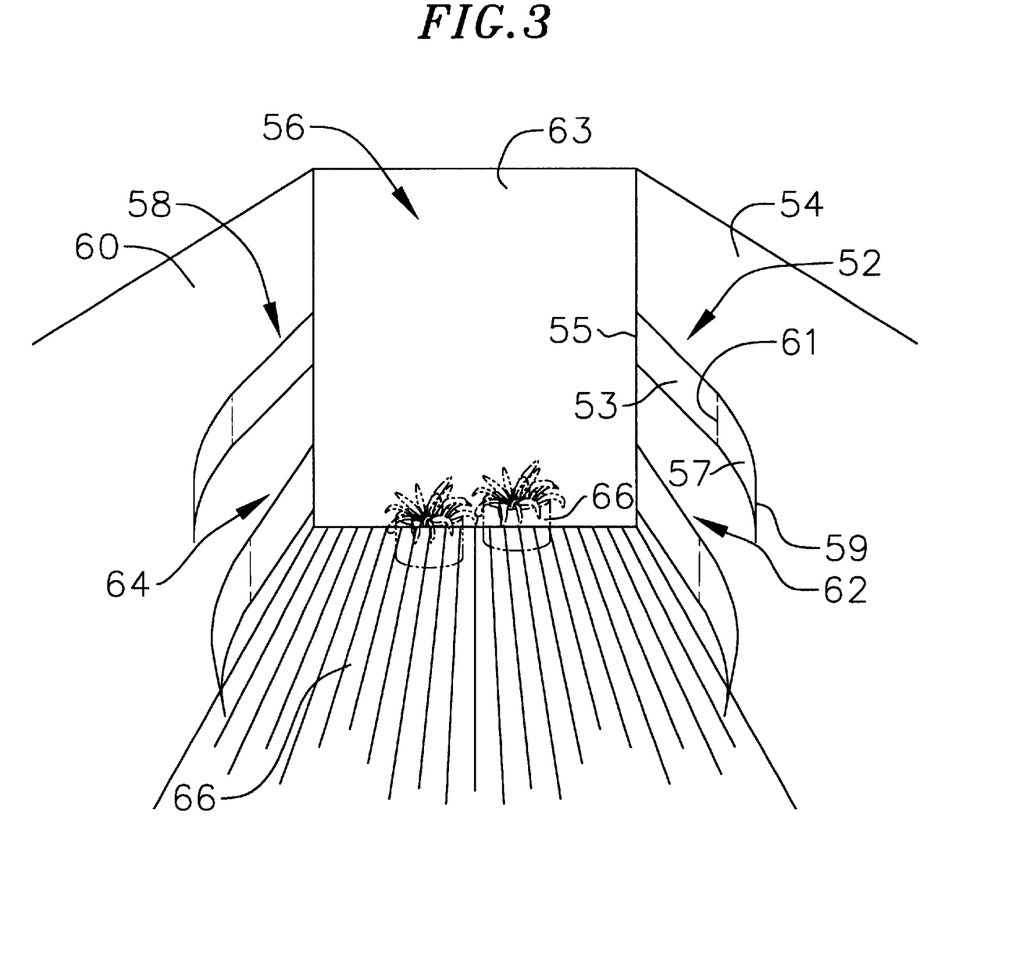
FIG. 3 shows an embodiment of the loading technique of the present invention wherein a portion of a panel of high tensile strength sheet material is adhered to the wall of the truck.

A loading method and apparatus according to the present invention is demonstrated in FIGS. 3–6. As shown in FIG. 3, a portion of a first panel 52 of a high tensile strength material is adhered to a side wall 54 of the truck storage compartment 56. The high tensile strength material should be a material that withstands a high shear force without losing its tensile strength. This material can be any suitable relatively flexible high strength sheet material having a modulus of elasticity which enables it to be linearly stretched sufficiently without break or loss of strength to resiliently absorb and cushion the shock of a load force suddenly applied to it. In the preferred embodiment, the material used is a commercially available product known as TY-GARD 2000, manufactured by Walnut Industries, Inc. of Philadelphia, Pa. TY-GARD 2000 has a stretch capacity of from 18 to 20 percent of its relaxed length without any reduction in its tensile strength.

The panel 52 has a first portion 53 at a first end 55 of the panel and a second portion 57 at a second end 59 of the panel. For ease of installation, the first portion 53 of the panel has an adhesive backing on the side facing the side wall 54. The adhesive backing is used to adhere the first portion 53 of the first panel 52 to the first side wall 54 of the truck. The second portion 57 of the panel 52 does not have an adhesive backing and, thus, does not adhere to the side wall of the truck.

In the preferred embodiment, the length of the panel 52 is approximately 10 feet and the first portion 53 is approximately half of the panel, or 5 feet in length. Accordingly, half of the panel 52 has an adhesive backing that adheres to the side wall of the truck. The adhesive backing preferably starts at the first end 55 of the panel and extends to the center 61 of the panel. The remainder of the panel, namely the second portion 57, does not have an adhesive backing and does not adhere to the side wall. The length of the panel and the length of the adhesive backing may vary depending on the size of the load on the truck.

A second panel 58 is adhered to a second side wall 60 of the truck, opposite from the first side wall 54. The second panel 58 is adhered in preferably a mirror relationship to the first panel 52 at the same height and along a parallel axis. The panels are preferably smoothed over using a roller to release any air bubbles trapped between the panels 52, 58 and the side walls 54, 60 and to ensure proper adhesion of the panels 52, 58 to the side walls 54, 60, respectively.

Depending on the size and weight of the load to be shipped, additional panels, similar to panels 52 and 58, may be added in a mirror relationship on each side above or below panels 52 and 58 to provide further support. FIG. 3 shows a third panel 62 adhered to the first side wall 54. For every additional panel that is added to the first side wall, there must be a corresponding panel adhered to the second side wall in preferably a mirror relation the panel on the first side wall. Accordingly, a fourth panel 64 is adhered to the second side wall 60 in a mirror relationship to the third panel 62 on the first side wall 54.

The exact height on the wall 54 at which the panel 52 is installed varies depending on the height of the load. If there is a small load that will not be stacked high on the truck, the panels can be installed at a lower height on the side walls. For a larger load, that will be stacked almost to the ceiling of the storage compartment, the panels should be installed at a higher height to provide support for the load at the top, as well as the bottom. The height of installation will also depend on the number of panels that are installed on each side wall. If there is a single panel installed on a side wall, the panel will be most efficiently utilized if it is installed at the center point of the load. In the preferred embodiment of the invention, two panels are used on each side wall. The first panel 52 is preferably installed approximately 4 to 5 feet above the floor 66 of the truck storage compartment 56. The first panel 52 is preferably installed on a straight line that is parallel with the plane of the floor 66. The third panel 62 is then installed preferably approximately 1 to 2 feet above the floor 66. The first panel 52 and third panel 62 are preferably installed in a parallel relationship to each other. The second and fourth panels 58, 64 are installed on the second side wall 60 in preferably a mirror relationship to the first and third panels 52, 62, respectively.

After all of the panels have been installed on the side walls of the truck storage compartment, the load, namely the nursery items may be packed on the truck. Nursery items include plants, flowers, trees, bushes, perennial and other similar items. Normally, the nursery items are each provided in a container. The containers vary in size, e.g., one gallon, five gallons, etc. size containers. The method of packing the nursery items depends on the size and shape of the containers and the fragility of the items themselves.

Figure 4A:
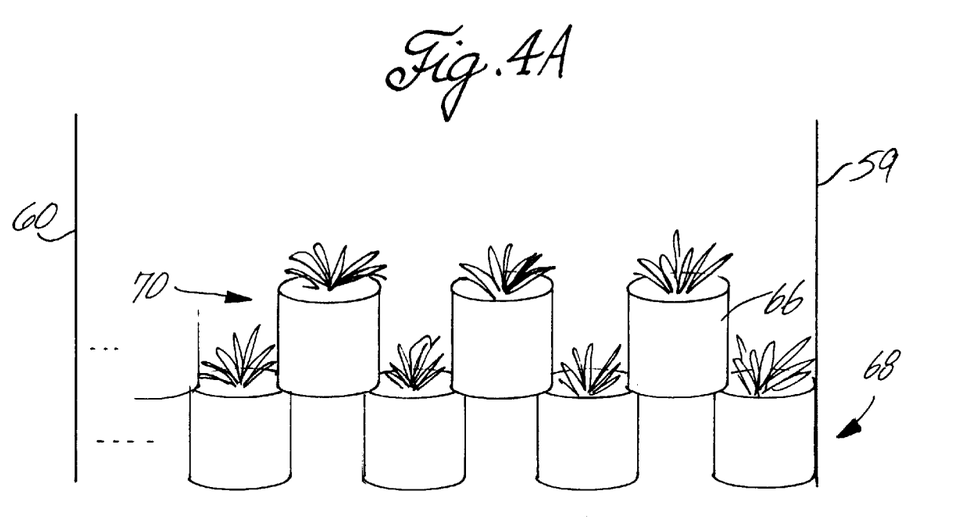
FIGS. 4A–4D show various methods of loading the nursery items in a staggered manner.
Figure 4B:
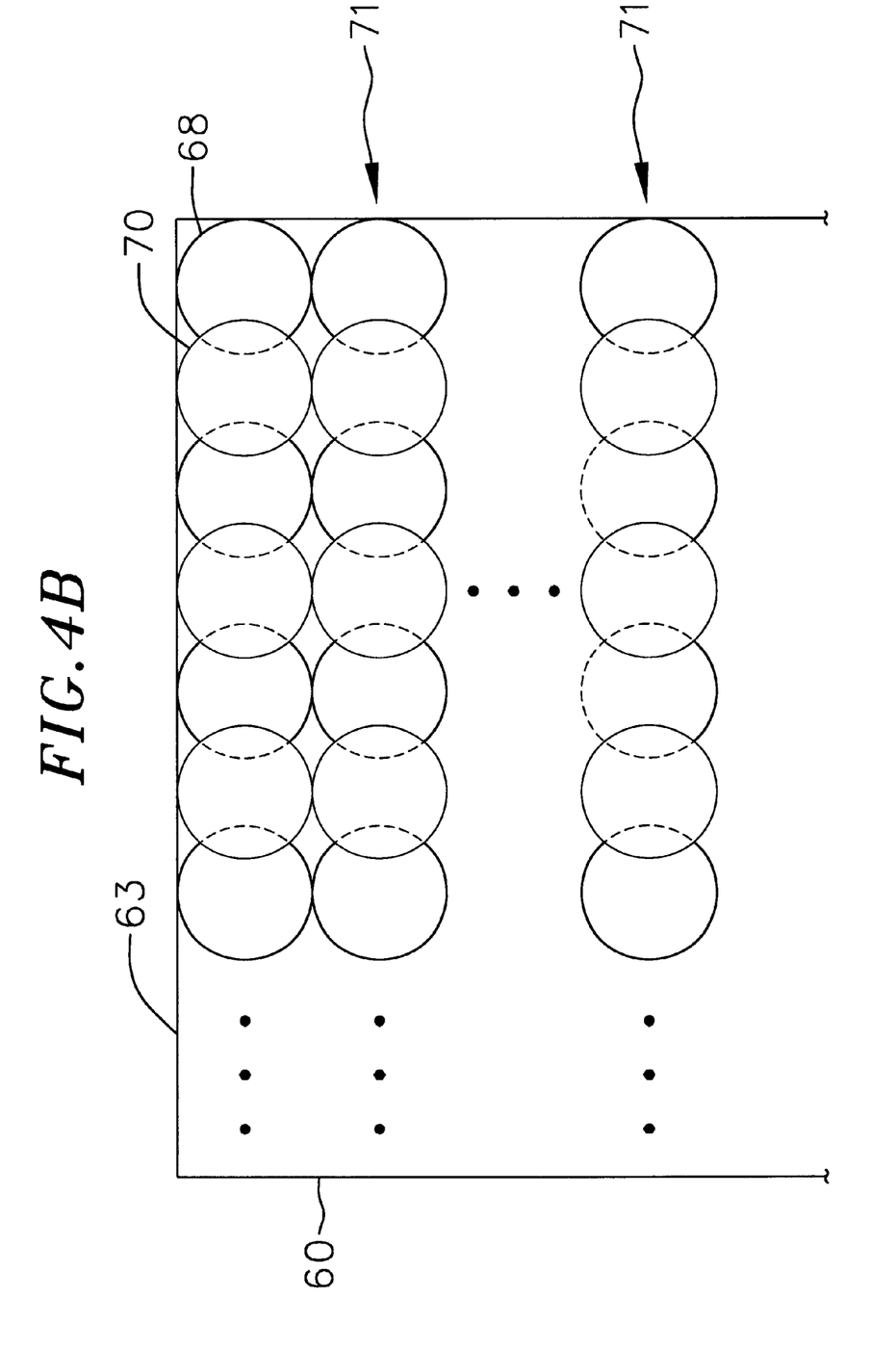

In one embodiment of the invention, shown in FIG. 4A, starting against the back panel 63 of the truck, the nursery containers 66 are stacked on top of each other in a staggered overlapping formation. The staggered formation is achieved by overlapping the containers of nursery items to create a zig zag pattern. Specifically, in this embodiment, a first row 68 of containers 66 is placed, extending from side wall to side wall of the truck, between the panels on the first and second side walls 54, 60. The containers are packed close enough together such that together with the plants, the containers are prevented from sliding around the floor of the truck. A second row 70 is then added, extending from side wall to side wall of the truck, with each container 66 in the second row 70 straddling two containers 66 on the first row 68, creating a staggered design. Additional rows can be added above the first and second rows as needed. As shown in FIG. 4B, one or more horizontally displaced rows 71 are added, extending from side wall to side wall of the truck, in front of and against each of the rows 68 and 70, on the opposite side from the back panel 63, and stacked in a similar staggered pattern to rows 68 and 70. This packing method is especially useful for packing cylindrical containers because the circular rims, together with their plants, provide ample support and stability for containers placed on top of the rims.

Figure 4C:
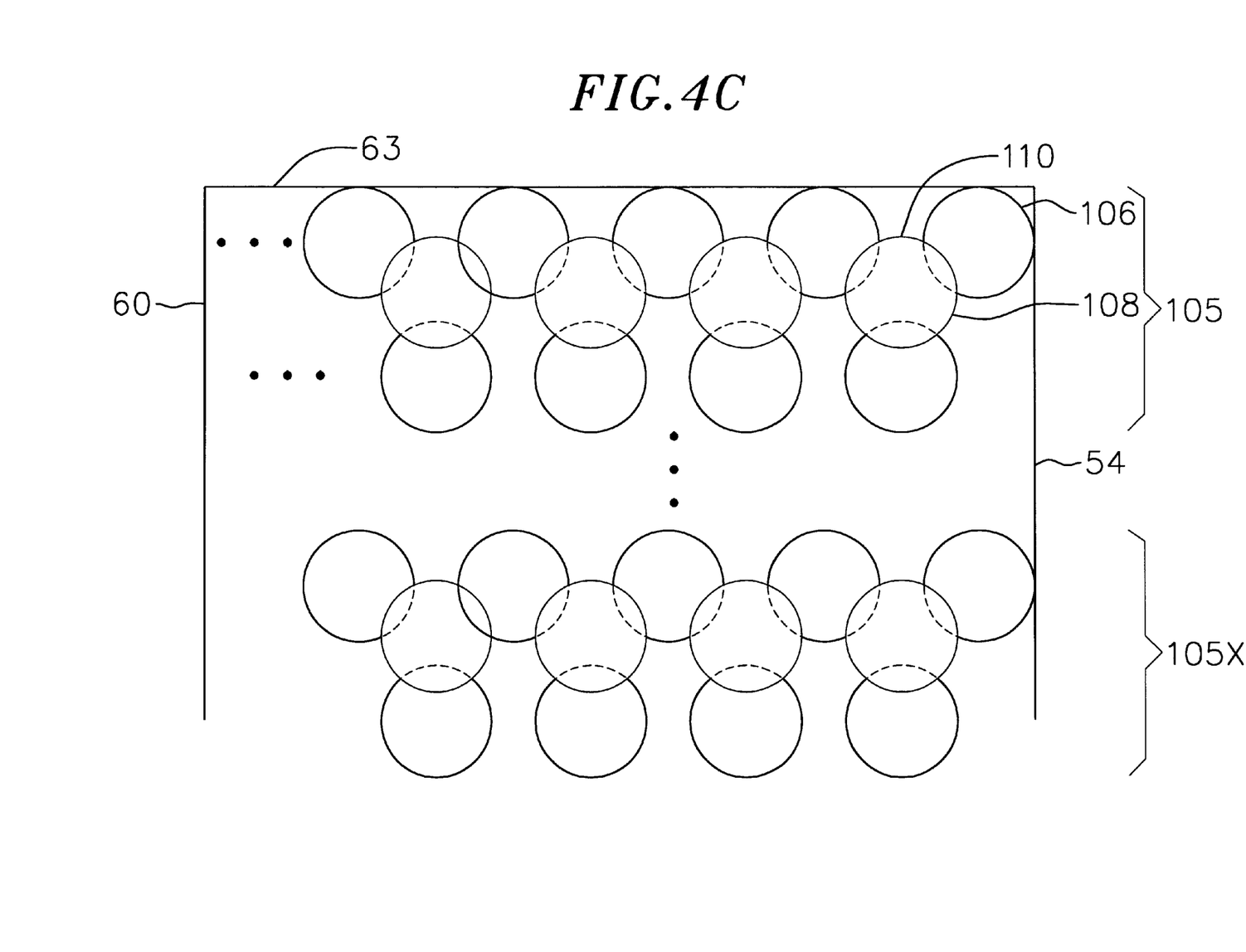
Figure 4D:
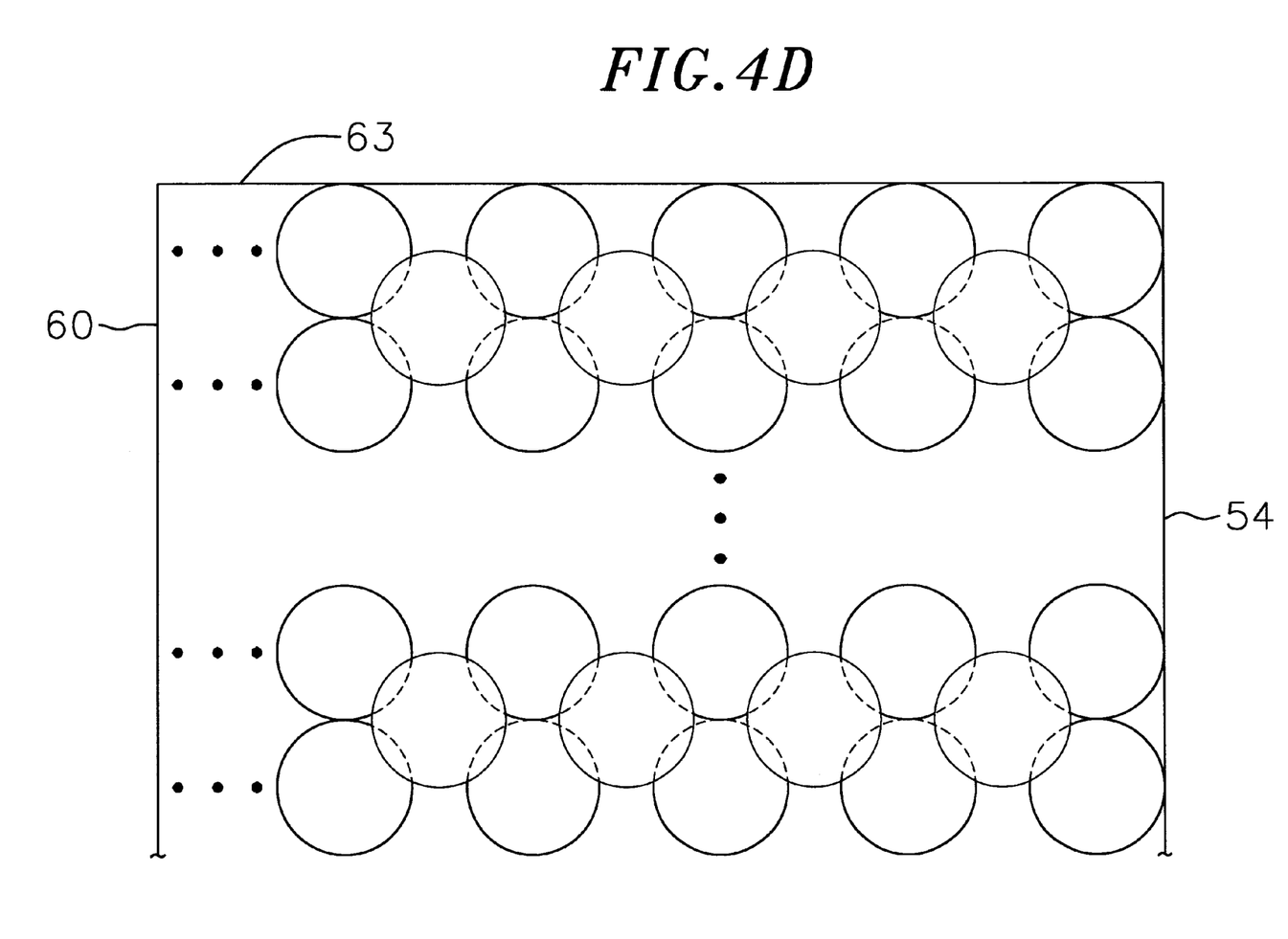

An alternative staggered design is depicted in FIG. 4C. In this design the plants are arranged in clusters 105 through 105X. The first cluster has a first row 106. A second row 108 is horizontally displaced in front of row 106 in a manner wherein each container in row 108 is between two containers in row 106. Another row 110 is stacked on top of rows 106 and 108 such that each container in row 110 is supported by a portion of at least three containers beneath it. This arrangement is repeated for each cluster 105 through 105X. Yet another alternative staggered design is depicted in FIG. 4D wherein each container in supported by the part of the rims of four containers below it.

Figure 8:
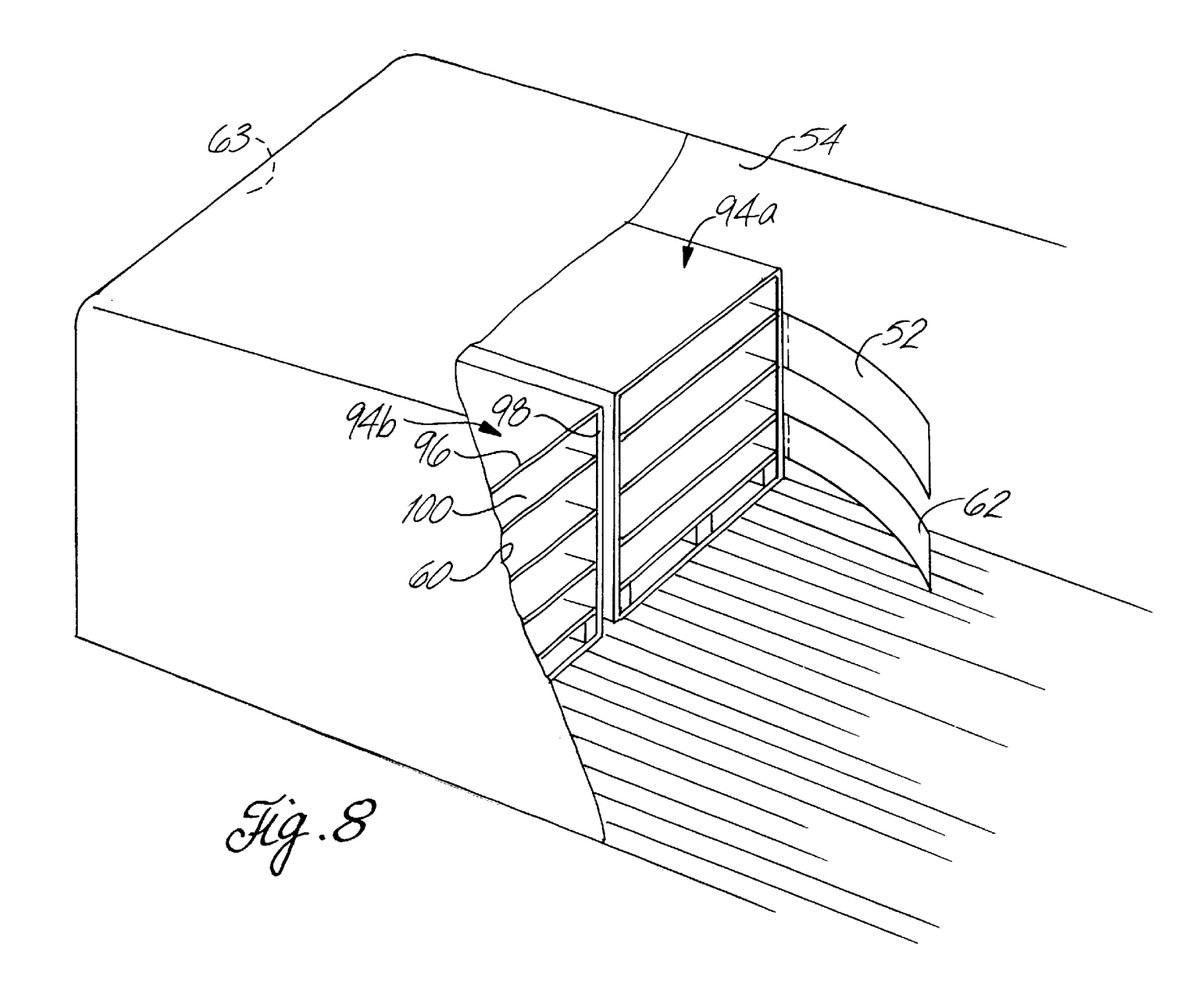
FIG. 8 shows an embodiment of the loading technique of the present invention wherein nursery items are packed on pallets.

Another method of packing the nursery items on the truck is storing the items on pallets, as shown in FIG. 8. In this embodiment, each pallet 94 is used to carry the nursery items. The pallet 94 includes a rack 96 having a plurality of rectangular support posts, one support post 98 at each of the four corners, attached to and supporting the corners of a plurality of vertically separated shelves 100. Rack 96 is preferably made of metal, however, any rigid material capable of supporting the weight of the nursery items can be used. Two pallets 94a and 94b are depicted extending side by side from the first side 54 to the second side 60 and abutting the back panel 63 so that the pallets cannot shift during transportation. The pallets 94a and 94b are placed between panels 52, 62 adhered to the first side wall and panels 58, 64 adhered to the second side wall. Nursery items (not shown) are packed on the shelves 100 of the pallet 94 in a manner that restricts movement of the items on the shelves 100. Restriction of movement can be achieved by packing the items close enough together to prevent the items from sliding around on the shelf. Alternatively, the nursery items can be surrounded by dividers that prevent the items from shifting.

The use of a pallet for packing nursery items is most useful for local deliveries wherein the truck will return the pallets to the growers. In the alternative, the pallets could be sold to the customers which will facilitate the unloading of the nursery items since the customer can simply unload the pallet with the nursery items intact on the pallet.

Figure 7:
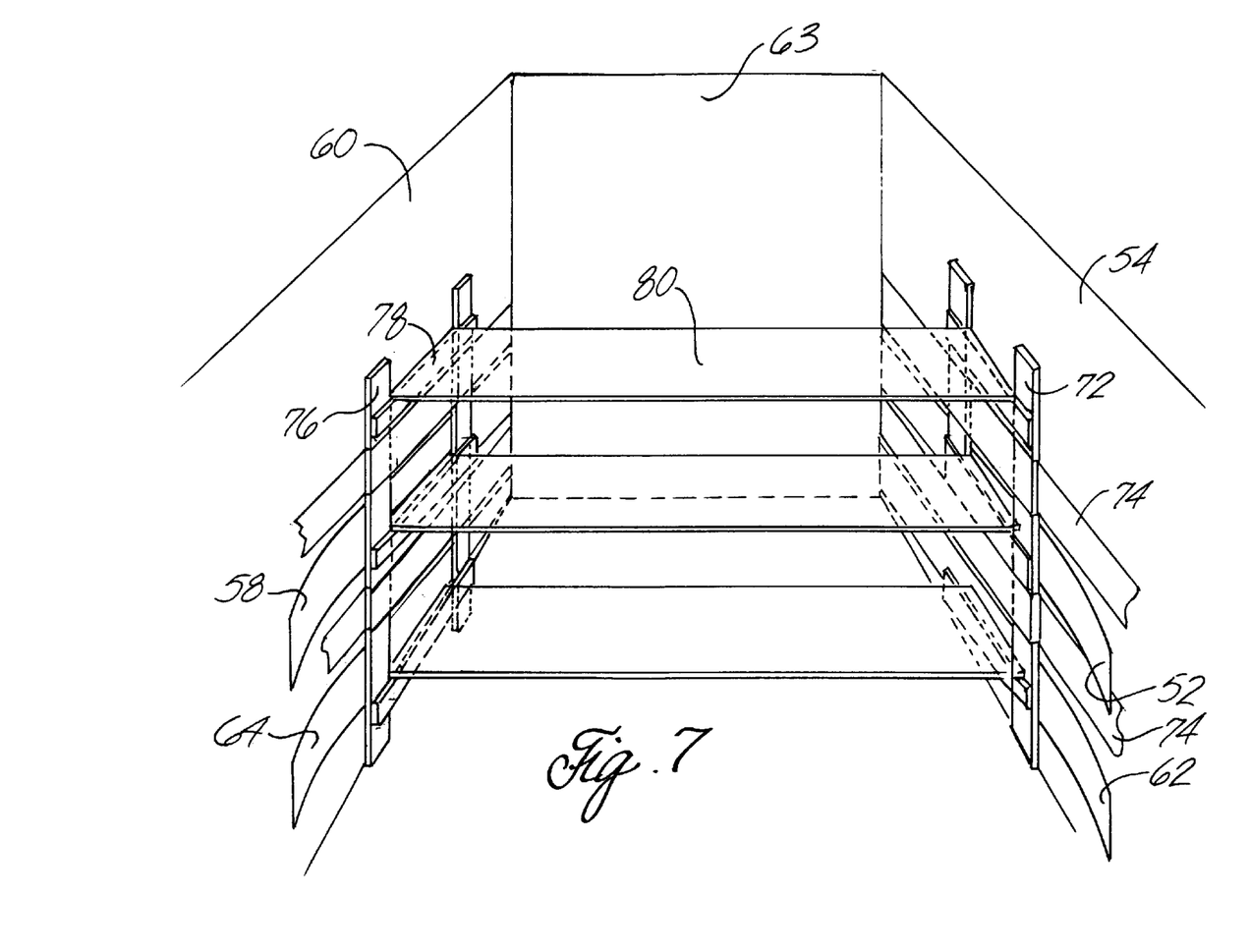
FIG. 7 shows an embodiment of the loading technique of the present invention wherein support posts are secured to the walls using a portion of the high tensile strength material panel and shelves are placed between the support posts.

FIG. 7 shows yet another method of packing nursery items on the truck. In this embodiment a first support post 72 is attached to the first side wall 54 using additional panels 74 of high tensile strength material of the same type as panels 52, 62, 58 and 66. The additional panels 74 preferably have an adhesive backing across the entire length of the panel. To install the first support post 72, the post must be aligned flat against the side wall 54. The adhesive backing of the additional panels 74 are then affixed over the side wall 54 and the first support post 72, fixing the first support post 72 to the wall 54.

The use of the additional panels 74 eliminates or reduces the damage to the truck wall caused by nailing the support post to the wall. Similarly, a second support post 76 is attached to the second side wall 60 in a mirror relationship to the first support post 72. The first and second support posts 72, 76 each have steps 78 for supporting shelves 80 placed thereon. The first and second support posts 72, 76 in conjunction with the additional panels 74 of high tensile strength sheet material provide sufficient support to endure the weight of the shelves and nursery items placed on the shelf. The nursery items should be packed on the shelves in a manner that would restrict their movement and prevent the items from sliding around on the shelves. Restriction of movement can be achieved by packing the items close enough together to prevent the items from sliding around on the shelf. Alternatively, the nursery items can be surrounded by dividers that prevent the items from shifting. The posts, steps and shelves are made of wood in one embodiment of the invention.

Figure 5:
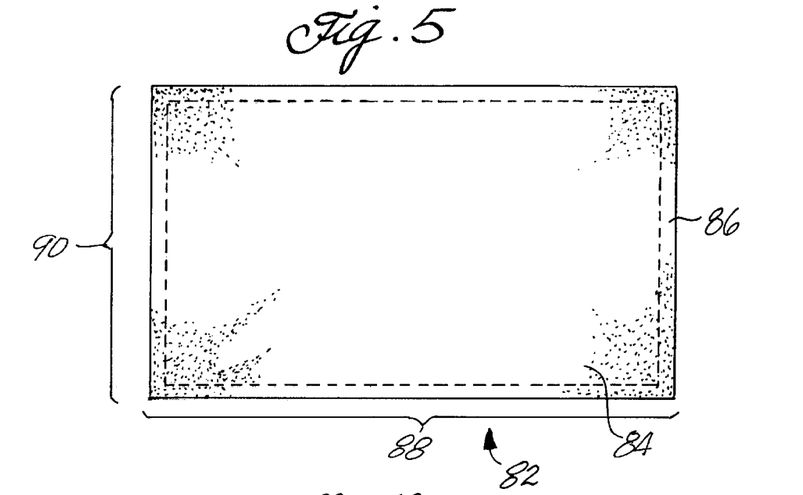
FIG. 5 shows an embodiment of the gate utilized in the loading technique of the present invention.

After the nursery items are packed on the truck between the panels on the first side wall 54 and the second side wall 60, a gate 82 is positioned at the end of the load to provide additional support for the nursery items. As shown in FIG. 5, in the preferred embodiment of the present invention, the gate 82 includes a rectangular piece of ground cloth 84 attached to a wooden frame 86. The ground cloth 84 can be attached to the frame 86 using known adhesives or fasteners. In the preferred embodiment, ground cloth 84 is stapled to frame 86. The width 88 of the gate 82 preferably spans the width of the truck storage compartment 56, from side 54 to side 60. The height 90 of the gate 82 should preferably be enough to substantially cover the vertically stacked nursery containers, the pallets or the wooden shelves.

Gate 82 of the present invention has numerous advantages over the known wooden gate 20 shown in FIG. 2. First, less wood is utilized in creating gate 82. Gate 82 only requires a wooden frame, that can be built from four wooden boards connected to form a rectangular shape. Known wooden gate 20, as shown in FIG. 2 and described above, requires substantially more lumber. Furthermore, the ground cloth 84 used to form gate 82 is recyclable. Growers and customers can use ground cloth for a variety of purposes, including, eliminating weeds by placing the ground cloth over a weed infested area.

Figure 6:
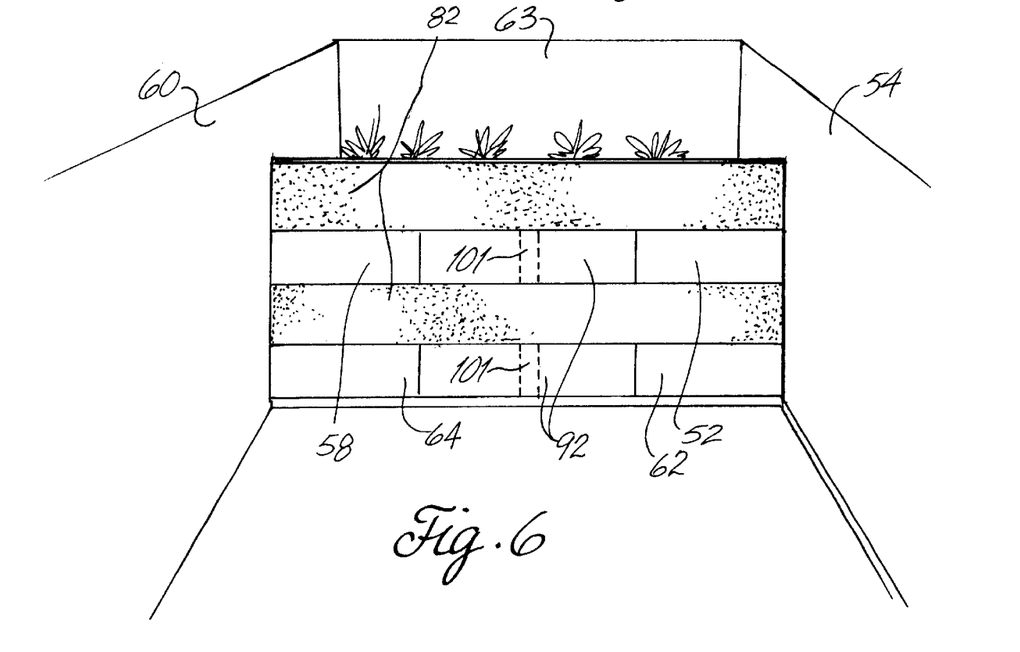
FIG. 6 shows an embodiment of the loading technique of the present invention wherein the ends of the panels on the first wall and the panels on the second wall are secured together in a tensile state in a manner that holds the gate and the nursery items firmly in place.

Gate 82 is positioned at the end of each of several loads in a truck. To secure the nursery items in a load, the second ends of the panels 52 and 58 are outstretched over the gate 82 and joined together as shown in FIG. 6. In the preferred embodiment, the second end 59 (shown in FIG. 3) of each panel is entirely free of any adhesive. The second ends are preferably joined together using an interface adhesive panel 92 which has an adhesive backing along the entire length of panel. To join the panels together, the second ends 59 of panels 52 and 58 are overlapped, twisted together, and sealed by an interface adhesive panel, as described more fully below.

Figures 10, 11, 12:
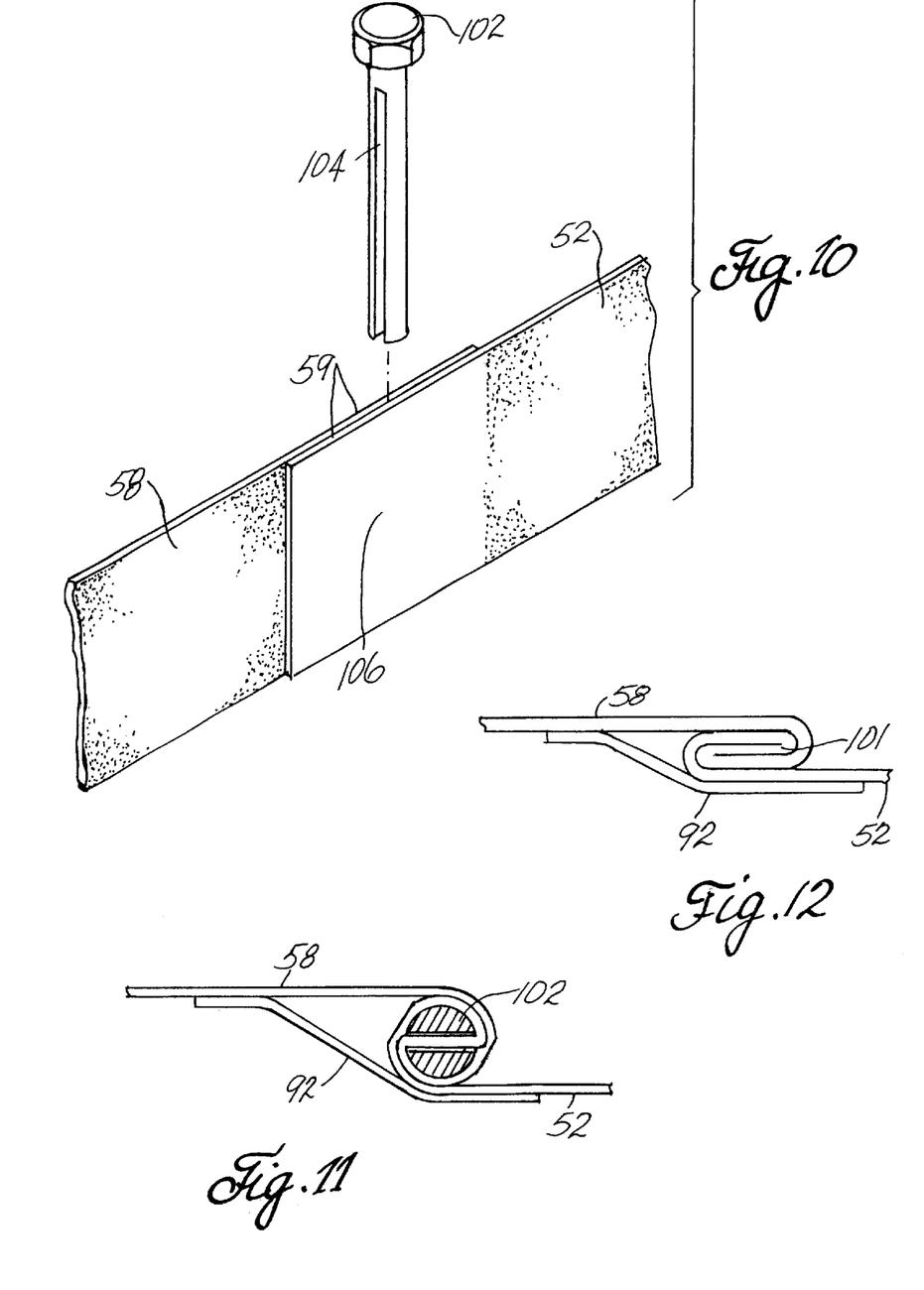
FIG. 10 shows the overlapping of the panels and the engagement with the tightening tool.
FIG. 11 shows the tightening of the overlapping panels and the securing of the panels using an interface adhesive panel.
FIG. 12 shows the panels of FIG. 11 after the tightening tool has been removed.

As shown in FIG. 10, when using the commercially available product TY-GARD 2000, after the free ends 59 of the panels are overlapped, a tool 102 is provided for tightly pulling the free ends of the panels together to ensure that the panels are attached together in a tensile state. The second ends 59 of the panels 52, 58 are first overlapped. The tightening tool 102 has a slit 104 which engages the overlapped portion 106. The tightening tool 102 is then twisted, as shown in FIG. 11, twisting the free ends 59 of the panels 52, 58 with it and tightening the panels. When the panels are sufficiently tightened, interface adhesive panel 92 is placed on the overlapping portion of the panels, as shown in FIG. 11, tightly securing the second ends 59 of the panels together. The tightening tool can then be removed by sliding the overlapped portion 106 out of the slit 104 of the tightening tool 102. FIG. 12 shows the panels 52, 58 in a folded configuration 101, after the tightening tool has been removed.

This process is repeated for joining the second ends 59 of the third and fourth panels 62, 64 together. If there are two or more rows of panels being tightened, all rows are preferably tightened simultaneously. This will prevent the discovery of a need to retighten a first row after a second row has been tightened. The interface adhesive panel 92 is commercially available as TY-PATCH 2000, also from Walnut Industries, Inc. of Philadelphia, Pa.

There are other means of tightening the panels including manual pulling or using other tools that will pull the panels toward each other. Furthermore, the free ends of the panel can be attached by using additional adhesive on the free ends, stapling, cementing or using other known adhesive and fastening methods.

Figure 9:
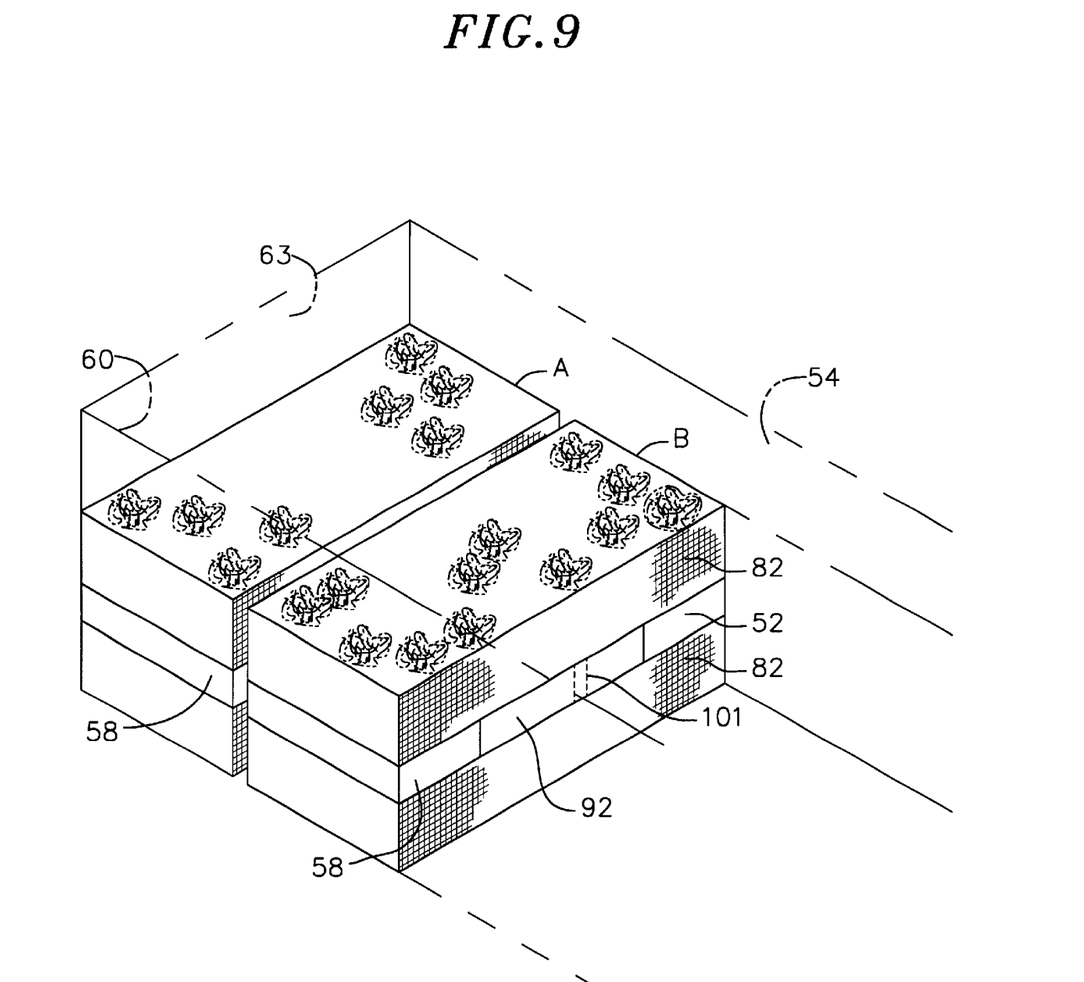
FIG. 9 shows a plurality of loads on packed on a truck.

As shown in FIG. 9, a plurality of loads can be placed on a single truck. FIG. 9 shows two loads, load A and load B placed on the truck. Typically, in the nursery shipping industry, seven loads are placed on each truck. In the preferred embodiment, the width of each load should be approximately five feet. In other words, the distance from the beginning of the load to the gate should be about five feet. After the first load is completed, a second load can be started immediately after the gate. The second and subsequent loadings are performed in the same manner as the first load by repeating the steps described above. A portion of a first and second panel is adhered to side walls 52 and 60, respectively. Nursery items are packed between the panels spanning from side wall to side wall. Gate 82 is positioned between the first and second panels in a manner that secures the nursery items in place. The free ends are first and second panels are attached together in a tensile state such that the load is securely held in place.

The device and method of loading nursery items on a truck described herein resolves many of the problems posed by previous shipping techniques. The amount of lumber used has been reduced substantially. There is no need for wooden linings that require damaging the truck walls by nailing wood to the walls. The customer's disposal and dunnage fees are eliminated. The cleaning costs charged by the carriers are also eliminated. Moreover, the cost of labor for unloading is substantially reduced because there is no longer a need for a crowbar to deconstruct the wooden supports. With the present shipping technique, a pair of scissors is the only tool required to cut through the panels and unload the nursery items.

While the invention is disclosed in conjunction with specific embodiments thereof, it is to be evident that many alternatives, modifications, and variations will be apparent to those skilled in the art in light of the foregoing description. Accordingly, it is intended to embrace all such alternatives, modifications and variations as falling within the spirit and broad scope of the appended claims.

What is claimed is:

1. A method of loading nursery items on a truck having a storage compartment, the storage compartment including a first side wall and a second side wall, the method comprising:

adhering a first end of a first panel of high tensile strength sheet material to the first side wall of the storage compartment of the truck;

adhering a first end of a second panel of high tensile strength sheet material to the second side wall of the storage compartment of the truck in mirror relationship to the first panel;

packing the nursery items in the storage compartment between the first panel and the second panel;

positioning a gate between the first and second panel in a manner that screens the nursery items, wherein the gate comprises a wooden frame shrouded by a piece of ground cloth; and securing a second end of the first panel and a second end of the second panel together in a tensile state such that the gate and the nursery items are securely held in place.

2. A method of loading nursery items on a truck in accordance with claim 1, further comprising the steps of:

adhering a first end of a third panel of high tensile strength sheet material on the first side wall of the storage compartment of the truck;

adhering a first end of a fourth panel of high tensile strength sheet material on the second side wall of the storage compartment of the truck in mirror relationship to the third panel; and securing a second end of the third panel and a second end of the fourth panel together in a tensile state such that the gate and the nursery items are securely held in place.

3. A method of loading nursery items on a truck in accordance with claim 2, wherein the first end of the third panel is adhered in a parallel relationship to the first end of the first panel.

4. A method of loading nursery items on a truck in accordance with claim 2, wherein the first end of the first panel of high tensile strength sheet material is adhered to the first side wall of the storage compartment of the truck approximately four to five feet above a floor of the storage compartment.

5. A method of loading nursery items on a truck in accordance with claim 4, wherein the first end of the third panel of high tensile strength sheet material is adhered to the first side wall of the storage compartment of the truck approximately one to two feet above the floor of the storage compartment.

6. A method of loading nursery items on a truck in accordance with claim 1, wherein packing the nursery items in the storage compartment between the first panel and the second panel further comprises stacking a plurality of nursery containers in a staggered manner.

7. A method of loading nursery items on a truck in accordance with claim 1, wherein packing the nursery items in the storage compartment between the first panel and the second panel further comprises positioning the nursery items on a pallet.

8. A method for loading nursery items on a truck in accordance with claim 1, further comprising positioning the gate transversely to the first and second side walls, between at least one of the first and second panels, and the nursery items.

9. A truck and apparatus for loading individual nursery items on the truck, the truck having a storage compartment, the storage compartment having a first wall, a second wall and a floor, the apparatus comprising:

a first panel of high tensile strength sheet material having a first portion and a second portion, the first portion of the first panel adhered to the first wall of the storage compartment;

a second panel of high tensile strength sheet material having a first portion and a second portion, the first portion of the second panel adhered to the second wall of the storage compartment in a mirror relationship to the first panel;

a plurality of individual nursery items packed between the first panel and the second panel;

a gate positioned between the first panel and the second panel in a manner that screens the nursery items, wherein the gate comprises a wooden frame shrouded by ground cloth; and a second end of the first panel secured to a second end of the second panel in a tensile state such that the gate and the nursery items are securely held in place.

10. The truck and apparatus for loading nursery items on a truck in accordance with claim 9, wherein the first panel and the second panel each has a length of approximately 10 feet.

11. The truck and apparatus for loading nursery items on a truck in accordance with claim 9, wherein the first portion of the first panel and the first portion of the second panel each has a length of approximately five feet.

12. The truck and apparatus for loading nursery items on a truck in accordance with claim 9, wherein the first portion of the first panel and the first portion of the second panel have a self-adhesive backing.

13. The truck and apparatus for loading nursery items on a truck in accordance with claim 9, further comprising:

a third panel of high tensile strength sheet material having a first portion and a second portion, the first portion of the third panel adhered to the first side wall of the storage compartment;

a fourth panel of high tensile strength sheet material having a first portion and a second portion, the first portion of the fourth panel adhered to the second side wall of the storage compartment in mirror relationship to the third panel; and a second end of the third panel secured to a second end of the fourth panel in a tensile state such that the gate and the nursery items are securely held in place.

14. The truck and apparatus for loading nursery items on a truck in accordance with claim 13, wherein the first end of the third panel is adhered to the first side wall in a parallel relationship to the first end of the first panel.

15. The truck and apparatus for loading nursery items on a truck in accordance with claim 13, wherein the first end of the first panel of high tensile strength sheet material is adhered to the first side wall of the storage compartment of the truck approximately four feet above a floor of the storage compartment.

16. The truck and apparatus for loading nursery items on a truck in accordance with claim 15, wherein the first end of the third panel of high tensile strength sheet material is adhered to the first side wall compartment of the truck approximately two feet above the floor of the storage compartment.

17. The truck and apparatus for loading nursery items on a truck in accordance with claim 9, wherein the plurality of individual nursery items are stacked in a staggered manner.

18. The truck and apparatus for loading nursery items on a truck in accordance with claim 9, wherein the plurality of individual nursery items are positioned on a pallet.

19. The truck and an apparatus for loading nursery items on the truck in accordance with claim 9, wherein the gate is positioned transversely to the first and second side walls, between at least one of the first and second panels, and adjacent to the nursery items.

20. A method of loading nursery items on a truck having a storage compartment, the storage compartment including a first side wall and a second side wall, the method comprising:

adhering a first end of a first panel of high tensile strength sheet material to the first side wall of the storage compartment of the truck;

adhering a first end of a second panel of high tensile strength sheet material to the second side wall of the storage compartment of the truck in mirror relationship to the first panel;

securing a first support post to the first wall using a third panel of high tensile strength sheet material;

securing a second support post to the second wall using a fourth panel of high tensile strength sheet material; and positioning a shelf between the first support post and the second support post for carrying nursery items;

packing the nursery items in the storage compartment between the first panel and the second panel;

positioning a gate between the first and second panel in a manner that screens the nursery items;

securing a second end of the first panel and a second end of the second panel together in a tensile state such that the gate and the nursery items are securely held in place.

21. A truck and apparatus for loading nursery items on the truck, the truck having a storage compartment, the storage compartment having a first wall, a second wall and a floor, the apparatus comprising:

a first panel of high tensile strength sheet material having a first portion and a second portion, the first portion of the first panel adhered to the first wall of the storage compartment;

a second panel of high tensile strength sheet material having a first portion and a second portion, the first portion of the second panel adhered to the second wall of the storage compartment in a mirror relationship to the first panel;

a first support post secured to the first side wall by a fifth panel of high tensile strength sheet material;

a second support post secured to the second side wall by a sixth panel of high tensile strength sheet material; and a shelf positioned between the first support post and the second support post for carrying nursery items;

a plurality of nursery items packed between the first panel and the second panel;

a gate positioned between the first panel and the second panel; and a second end of the first panel secured to a second end of the second panel in a tensile state such that the gate and the nursery items are securely held in place.

* * * * *